E. R. McKEAN.
Ambulance.
No. 44,643.
2 Sheets—Sheet 2.
Patented Oct. 11, 1864.
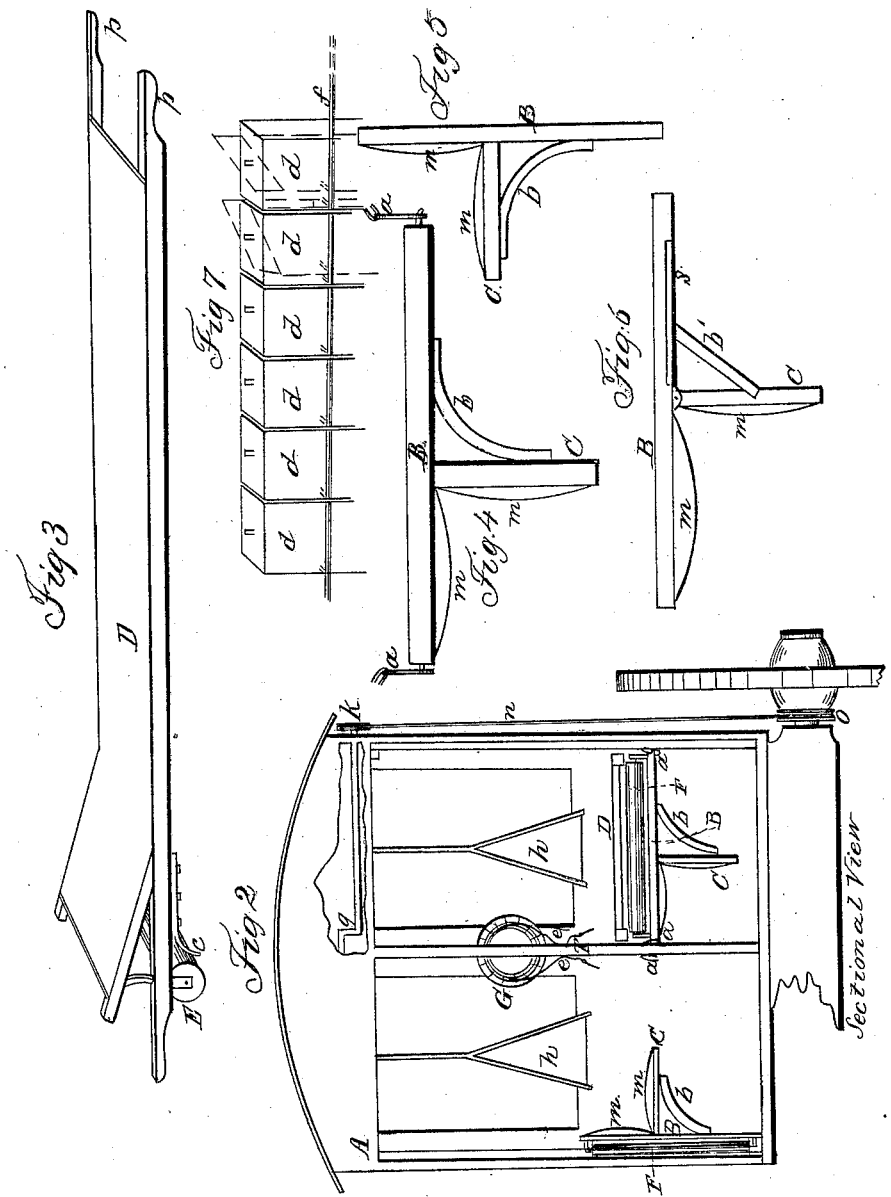
Witnesses.
M. E. Dodge
R. D. O. Smith
Inventor
E. R. McKean

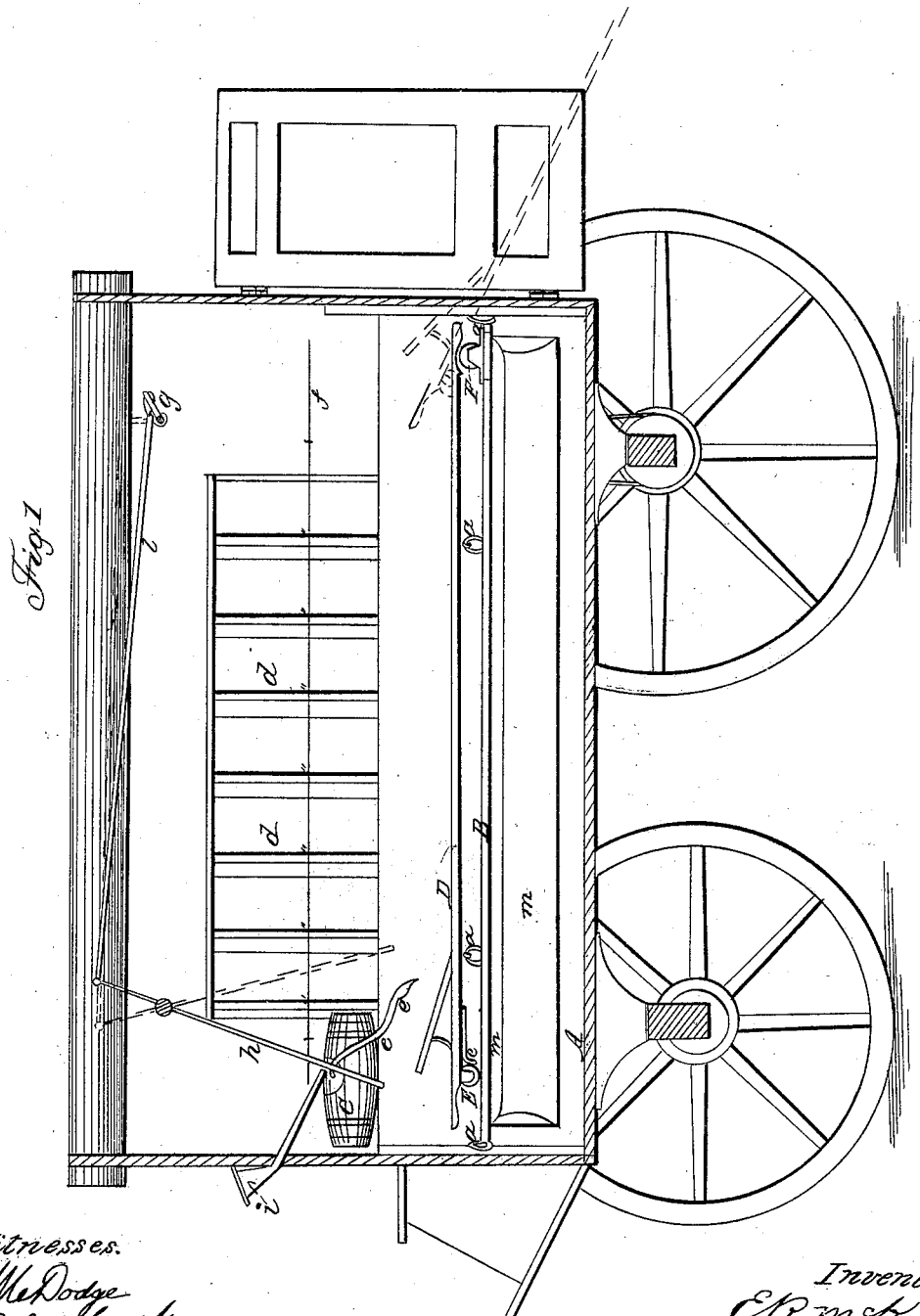

UNITED STATES PATENT OFFICE.

EDWIN R. McKEAN, OF WASHINGTON, DISTRICT OF COLUMBIA.

IMPROVEMENT IN AMBULANCES.

Specification forming part of Letters Patent No. 44,643, dated October 11, 1864.

*To all whom it may concern:*

Be it known that I, EDWIN R. MCKEAN, of Washington city, in the District of Columbia, have invented certain new and useful Improvements in Ambulances; and I do hereby declare that the following is a full, clear, and exact description thereof, reference being had to the accompanying drawings, making part of this specification, and to the letters of reference marked thereon, in which—

Figure 1 is a side elevation with the front of the side removed, so as to exhibit the interior thereof; Fig. 2, a rear elevation with the doors removed; Fig. 3, a perspective view of a novel stretcher forming part of my invention; Figs. 4, 5, and 6, end views of a false bottom convertible at will into seats, and Fig. 7 a perspective view of the blinds used in the sides of the body.

Similar letters indicate similar parts in all the figures.

To enable others to construct and use my invention, I will proceed to describe it.

A represents the body or box of an ambulance, which is shown mounted directly upon the running-gear of an ordinary wagon, though, if preferred, it may be provided with springs in the ordinary manner. The box A is shown divided longitudinally into two compartments by the division-board T, though it is obvious that the division T need not extend all the way to the top.

Within the body A is mounted a false bottom, B—one in each compartment—as shown in Fig. 2, in which it is shown turned up on edge, as hereinafter explained. The construction of this bottom B is more clearly shown in Fig. 4, centrally and longitudinally of the bottom B. On its under side is secured the plank C in a vertical position, the under side of one-half of B, and also the adjacent side of C, being provided with a cushion, *m*, as shown in the various figures. This bottom B is hung upon hooks or pins to the sides of the box by rubber bands, as shown at *a*, Figs. 1, 2, and 4. Upon the upper rear end of B is secured a roller, F, the object and use of which will be hereinafter explained.

I then construct a stretcher, D, as clearly shown in Fig. 3, to the front end of which, on its under side, is secured a roller, E, similar to F. To the under side of the frame or side pieces of stretcher D and near to roller E, I secure the hook *c*, as shown in Figs. 1 and 3. When in use traveling, the stretcher D rests upon the bottom B within the box A, as shown in Fig. 1.

At any convenient point, at the front of box A, a water-cask, G, is secured which may be provided with the tube *i*, having a funnel-shaped mouth, as shown in Fig. 1, for convenience in filling it. To this cask are secured one or more flexible tubes, *e*, of sufficient length to reach the mouth of the occupants of the stretcher D. These tubes *e* may be provided, if desired, with the ordinary rubber bulb and valves, as indicated by *e'*, by which water may at any time be drawn from the cask G by the hand; or the simple tube *e* may be used, in which case the water will be drawn from the cask by the suction of the patient.

Secured to the interior of box A, at any desired position, is a fan, *h*, which, in this case, is shown operated by the motion of pulley *o*, attached to one of the hind wheels of the vehicle, the motion being transmitted through the medium of the belt or cord *n*, pulley *k*, crank-shaft *g*, and connecting-rod *l*, as shown in Figs. 1 and 2. It is obvious that any other fanning device—as, for instance, a rotating fan—may be substituted instead of the oscillating fan *h*, and made to produce the same result—namely, supply air to the occupants of the ambulance. If an oscillating fan is used, it should be located near the front, for the twofold purpose of supplying the air to the face or head of the patient, and also that it may be out of the way. In case a revolving fan is used, it may be located at any point, and the air conveyed by means of tubes to the desired location.

The body A of the ambulance may be made of any suitable material, but should be so constructed that it may be closed in such a manner as to exclude the cold, rain, and dust. In each side of the body A, I arrange a series of vertical slats or blinds, *d*, as seen in Figs. 1 and 7. The edges of these slats *d* are beveled, so that they can be shut up or closed in such a manner as to present a smooth or plane surface, as shown in Fig. 7, the red lines indicating their position when open. A rod, *f*, serves to operate the blinds in the usual manner.

The foregoing constitutes the essential features of my invention, the operation of which is as follows: When used for removing wounded and disabled men from the battle-field, it is driven to the proper position, and the stretcher D is then drawn out at the rear until the hooks *c* catch uppon the roller F, when the other end is let down upon the ground, as indicated in red in Fig. 1. In this position a single attendant is enabled to place a wounded man upon it without help. Then, by taking hold of the handles *p*, he raises the stretcher to a horizontal position, and, as the other end rests upon the roller F, he can readily shove it endwise into the ambulance, it being evident that when it has advanced part way in, a portion of the weight will be thrown upon roller E. The hooks *c* not only hold the stretcher D in position, as shown in Fig. 1, but they also prevent it from falling to the ground, as would otherwise be the case were the team to start forward while the wounded soldier was being placed in the ambulance—an accident that not unfrequently occurs, and by which great suffering is caused. The bottom B, being suspended by the rubber bands *a*, readily yields to the motion of the vehicle, thereby preventing all sudden jars, and rendering the position of the wounded or sick soldier as easy and comfortable as possible. By means of the flexible tubes *e*, which are placed within his reach, he can at all times supply himself with drinking-water without the aid of an attendant and without stopping the vehicle. A door closes the box at the rear end, while a window in the front enables the driver at all times to observe the condition and wants of the wounded, and, if necessary, to assist them by opening the same so that he can reach them. As the ambulance moves, motion is given to the fans, which thus furnish a supply of air to the faint and wounded occupants. The blinds *d* will of course be opened or closed, as circumstances shall require.

When it is desired to remove the occupant from the ambulance, the stretcher is taken entirely out with the wounded person on it, who is thus conveyed wherever desired without transferring him from a stretcher to the ambulance and then from the ambulance to a stretcher again, as is usually the case with ambulances as generally constructed, and thus much unnecessary pain and suffering are avoided, especially in the case of those having very severe wounds or broken and shattered limbs.

Another advantage of my improvement is, that the blood from the wounds, instead of flowing upon the cushions of the ambulances, by which they soon become clotted and soiled, passes through the cloth bottom of stretcher D upon the wood bottom B, and even if it should flow in such quantities as to run off at the sides of B, still it does not flow on the cushions *m*, but passes down onto the bottom of the box, from which, as well as from the bottom B, it can be readily cleaned.

If it be desired to use the ambulance for other purposes—such as conveying invalids able to set upright—then the stretcher D is removed and hung on the outside or placed on the top of A, the false bottom B is unhooked from its supports and turned up on its edge against the sides of the box, as shown at the left-hand side of Fig. 2, and also in Fig. 5. When thus placed, the strip C forms a seat, which, with its back, is provided with the cushions *m*, as already explained, and as clearly shown in Figs. 2 and 5. It will be understood that, if desired, the seats may be arranged against the partition T, by which they will be brought back to back, and that in either case they will be secured in position by any suitable means.

If it be desired to place the body A of the ambulance upon springs, I then construct the false bottom B and seat C, as shown in Fig. 6. In that case the seat C, being hinged, can be turned up against B, where it will fit in the recess S, the brace *b'*, that supports it when used as a seat, being also pivoted. By this means the bottom B, and with it stretcher D, may be brought much nearer the bottom of the body A, and thus prevent being raised too high by the springs underneath the same.

It is obvious that when the body of the ambulance is placed on springs the false bottom B may be dispensed with, the roller F in such case being secured to the bottom or floor of the ambulance-body; or it may be entirely dispensed with, the roller E on the stretcher D being sufficient to enable the attendant to shove it in to its place by holding up the rear end. In such case the seats C may be hinged to the sides of the box, so as to be turned either up or down out of the way when not in use.

Having thus fully described the construction and operation of my invention, what I claim as new, and desire to secure by Letters Patent, is—

1. The false bottom B, constructed substantially as described, and supported upon the rubber springs *a*, or their equivalents.

2. The roller F, arranged to operate as described, whether the same be attached to the false bottom B or to the bottom of the body A.

3. The stretcher D, provided with the roller E and hook *c*, or its equivalent, when constructed and operating as and for the purpose herein set forth.

4. Providing an ambulance with a water-vessel, having tubes so arranged that the occupants can supply themselves at pleasure.

5. Arranging a fan in connection with an ambulance in such a manner as to supply a current of air to the occupant, sub tantially as and for the purpose herein set forth.

6. Constructing the sides of the body of an ambulance with vertical slats having beveled edges, so that when said slats are closed they shall present a plane surface, both externally and internally, as shown and described.

E. R. McKEAN.

Witnesses:
W. C. DODGE,
R. D. O. SMITH.